United States Patent
Musale et al.

(10) Patent No.: US 8,597,515 B2
(45) Date of Patent: Dec. 3, 2013

(54) PURIFICATION OF OIL SANDS POND WATER

(75) Inventors: Deepak A. Musale, Aurora, IL (US); Anthony G. Sommese, Aurora, IL (US); Walter H. Goodman, Lisle, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 12/881,303

(22) Filed: Oct. 4, 2010

(65) Prior Publication Data

US 2011/0108480 A1    May 12, 2011

Related U.S. Application Data

(63) Continuation of application No. 11/872,288, filed on Oct. 15, 2007, now abandoned.

(51) Int. Cl.
| | | |
|---|---|---|
| B01D 61/16 | (2006.01) | |
| B01D 61/22 | (2006.01) | |
| C02F 1/40 | (2006.01) | |
| C02F 1/44 | (2006.01) | |

(52) U.S. Cl.
USPC ........ 210/639; 210/747.9; 210/637; 210/806; 210/693

(58) Field of Classification Search
None
See application file for complete search history.

(56) References Cited

U.S. PATENT DOCUMENTS

| | | | |
|---|---|---|---|
| 3,723,310 A | 3/1973 | Lang et al. | |
| 3,956,122 A | 5/1976 | Coscia et al. | |
| 4,414,117 A | 11/1983 | Yong et al. | |
| 4,676,908 A | 6/1987 | Ciepiela et al. | |
| 4,715,962 A * | 12/1987 | Bhattacharyya et al. | 210/708 |
| 4,792,406 A * | 12/1988 | Allenson et al. | 210/734 |
| 4,848,460 A | 7/1989 | Johnson, Jr. et al. | |
| 4,851,123 A | 7/1989 | Mishra | |
| 5,330,546 A | 7/1994 | Ramesh et al. | |
| 5,476,522 A * | 12/1995 | Kerr et al. | 446/26 |
| 5,622,647 A | 4/1997 | Kerr et al. | |
| 5,788,867 A | 8/1998 | Pearson | |
| 5,804,077 A * | 9/1998 | Smith et al. | 210/702 |
| 6,926,832 B2 * | 8/2005 | Collins et al. | 210/615 |
| 2003/0159990 A1 | 8/2003 | Collins et al. | |
| 2004/0168980 A1 * | 9/2004 | Musale et al. | 210/639 |
| 2007/0102359 A1 | 5/2007 | Lombardi et al. | |

FOREIGN PATENT DOCUMENTS

| | | |
|---|---|---|
| CA | 1180827 | 1/1985 |
| CA | 1234764 | 4/1988 |
| CA | 2364854 | 6/2002 |
| CA | 2582059 | 9/2008 |
| WO | 2007047481 | 4/2007 |

OTHER PUBLICATIONS

Sego, David. "Environmental impact of the oil sands development," Gussow-Nuna Geoscience Conference, Oct. 2008, p. 1-40.*

(Continued)

*Primary Examiner* — Katherine Zalasky
(74) *Attorney, Agent, or Firm* — Edward O. Yonter; Andrew D. Sorensen

(57) ABSTRACT

A method of enhancing flux of tailings settling pond water from an oil sands process through a membrane separation system and purifying the water comprising is disclosed. The process comprises the following steps: (a) treating the water with an effective amount of one or more water-soluble cationic polymers, amphoteric polymers, zwitterionic polymers, or a combination thereof; (b) passing the treated water through a membrane separation system; and (c) optionally, passing the permeate from step (b) through an additional membrane separation system.

16 Claims, 3 Drawing Sheets

(56) References Cited

OTHER PUBLICATIONS

Bacchin et al. Critical and sustainable fluxes: Theory, experiments and applications. Journal of Membrane Science 281 (2006) 42-69.*

Peng H. et al., "Application of nanofiltration to water management options for oil sands operations", Desalination, 2004, pp. 137-150, 170, Elsevier B.V.

Visvanathan C. et al., "Volume reduction of produced water generated from natural gas production process using membrane technology", Water Science and Technology, 2000, vol. 41-No. 10-11, pp. 117-123, IWA Publishing.

* cited by examiner

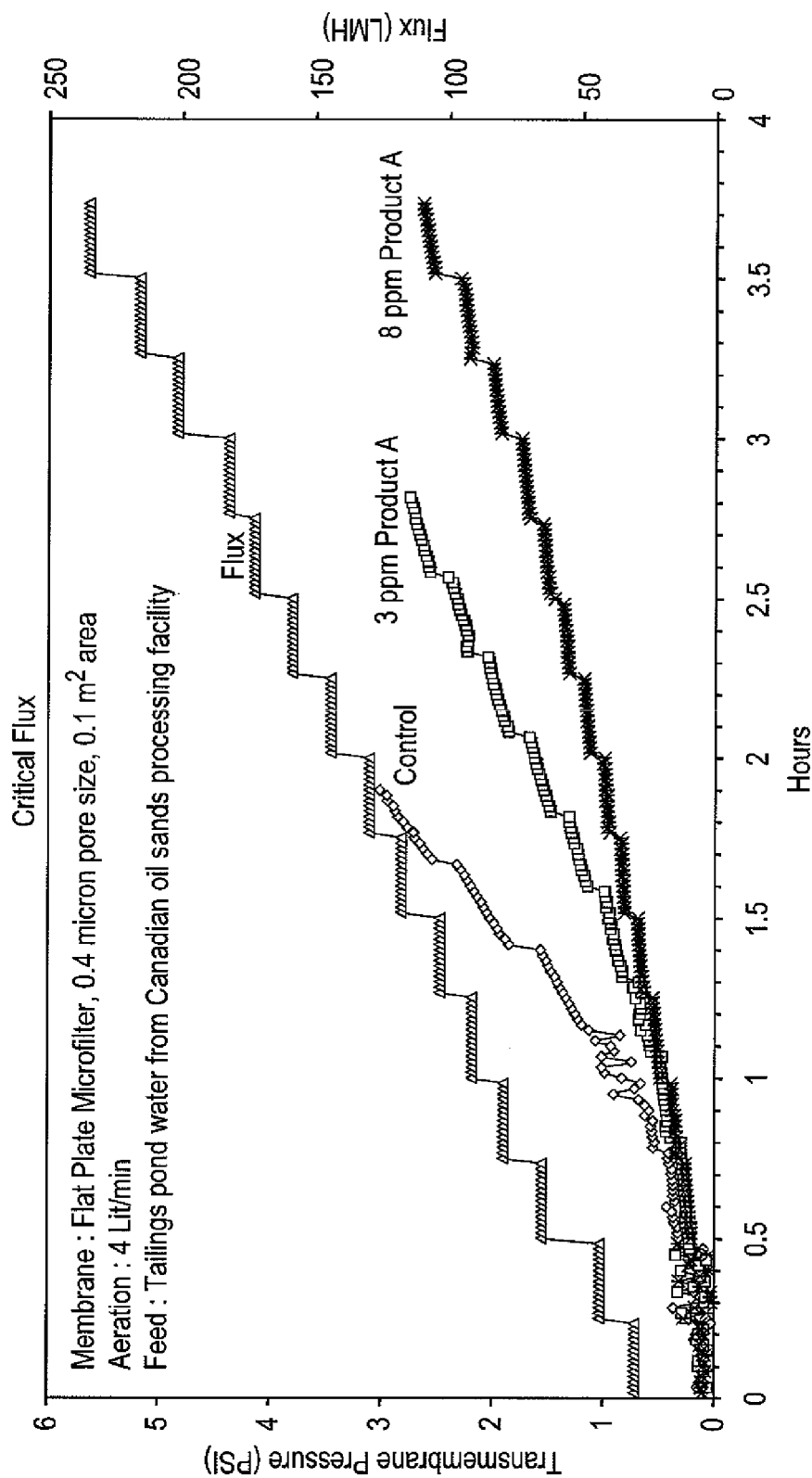
FIG. 2 Critical flux with control and PRODUCT A treated pond water

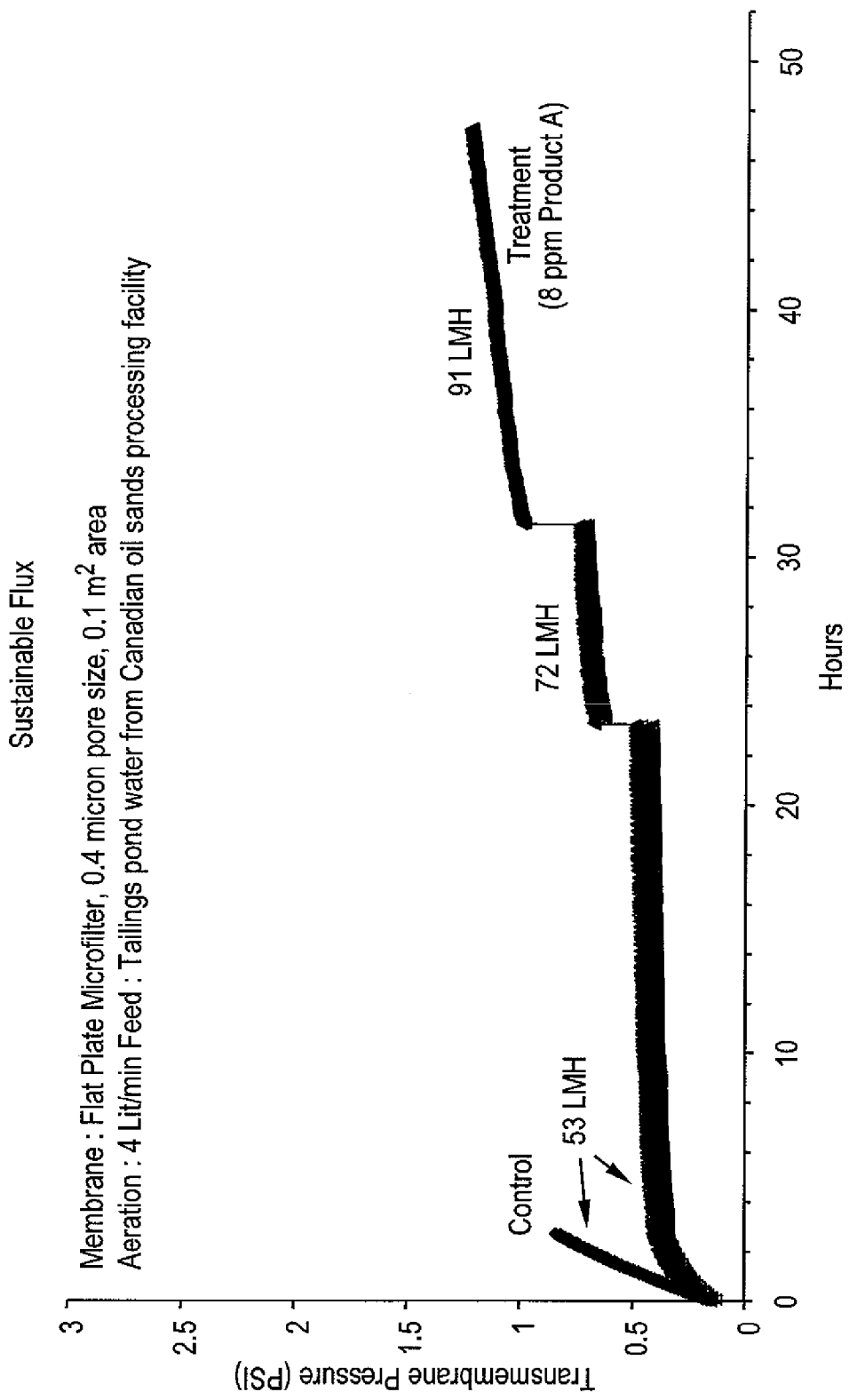

PURIFICATION OF OIL SANDS POND WATER

CROSS-REFERENCE TO RELATED APPLICATION

This is a continuation application of U.S. patent application Ser. No. 11/872,288, "Purification of Oil Sands Pond Water," filed on Oct. 15, 2007, now abandoned, which is incorporated herein by reference in its entirety.

FIELD OF THE INVENTION

This invention is in the field of purifying oil sand process water and improving processes that carry out this task. More specifically, the invention relates to improved methods of enhancing flux through membrane separation systems.

BACKGROUND OF THE INVENTION

Water is integral to an oil sands processing operation because it facilitates the transfer and/or separation of mined material. Constituents of the mined material include hydrocarbon (sometimes referred to as bitumen), sand, clay, and water. The most common process to extract the hydrocarbon from the mixture involves crushing the mined material and later suspending the material in water, typically with the addition of heat, to form a slurry. The resultant slurry is processed, for example, by using froth flotation via the addition of chemicals to the slurry. This promotes the formation of a stable froth containing the hydrocarbon and the separation of the hydrocarbon from the other constituents.

Large amounts of water are required to facilitate the above separation process. The resultant stream, which contains the unwanted constituents, is sent to a tailings settling pond to allow the sand, clay, and other particulate(s) to settle.

Environmental concerns coupled with the large amounts of water involved make it mandatory to return much, if not all, of the water to the process. The return of water to an oil sands process, which contains unwanted constituents, can impair the oil sands process operation. Potential problems include, but are not limited to, erosion of pumps and piping from entrained particles, and loss in hydrocarbon separation efficiency from accumulation of fine particles, etc. An additional problem derives from the discharge of pond water when a mine is closed. When this occurs, local water quality permit obligations may require removal of unsettled or colloidal particles from the pond water.

Reclamation of tailings pond water for process reuse and other uses, especially back into an oil sands process, is an industry focus. Purifying the water through membrane separation systems is problematic because the process water from oil sands has large amounts of hydrocarbons and particulate matter. The water makeup creates a prime environment for fouling of membranes and subsequent reduction in water flux through the membranes.

Fouling of membranes and reducing flux through membranes makes the processing of water for reuse in an oil sands process less efficient. More specifically, when the membrane fouls, it is less efficient in that it requires more frequent cleaning and possible replacement. In addition, it also takes more energy and time for filtering when membranes foul, and the pond water passes through a membrane at a slower rate.

Therefore, a more efficacious method of enhancing flux of pond water from oil sands through a membrane separation system and purifying the process water is desired.

SUMMARY OF THE INVENTION

The present disclosure provides for a method of enhancing flux of tailings settling pond water from an oil sands process through a membrane separation system and purifying the water comprising the following steps: (a) treating the water with an effective amount of one or more water-soluble cationic polymers, amphoteric polymers, zwitterionic polymers, or a combination thereof; (b) passing the treated water through a membrane separation system; and (c) optionally, passing the permeate from step (b) through an additional membrane separation system.

BRIEF DESCRIPTION OF THE DRAWINGS

FIG. 2 shows data for critical flux.
FIG. 3 shows data for sustainable flux.

DETAILED DESCRIPTION OF THE INVENTION

Figure 1:
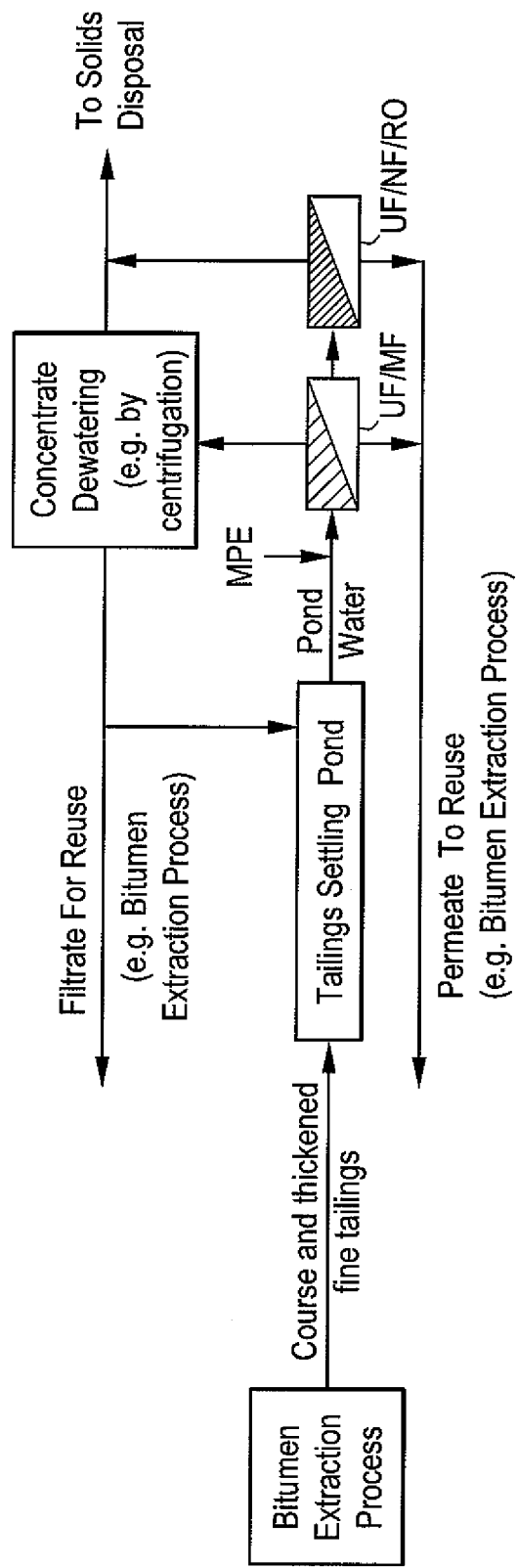
FIG. 1 shows a schematic of one embodiment of the claimed invention.

Definitions of Terms
"UF" means Ultrafiltration.
"MF" means Microfiltration.
"NF" means Nanofiltration.
"RO" means Reverse Osmosis.
"LMH" means Liters per meters$^2$ per hour.
"TMP" means Trans-membrane Pressure.
"NTU" means Nephelometric Turbidity Units.
"MPE" means Membrane Performance Enhancer.
"TOC" means Total Organic Carbon.
"TSS" means Total Suspended Solids.
"TS" means Total Solids.
"Pt—Co" means Platinum-Cobalt Color Units.
"Amphoteric polymer" means a polymer derived from both cationic monomers and anionic monomers, and, possibly, other non-ionic monomer(s). Amphoteric polymers can have a net positive or negative charge. The amphoteric polymer may also be derived from zwitterionic monomers and cationic or anionic monomers and possibly nonionic monomers. The amphoteric polymer is water-soluble.

"Cationic polymer" means a polymer having an overall positive charge. The cationic polymers of this invention are prepared by polymerizing one or more cationic monomers, by copolymerizing one or more nonionic monomers and one or more cationic monomers, by condensing epichlorohydrin and a diamine or polyamine or condensing ethylenedichloride and ammonia or formaldehyde and an amine salt. The cationic polymer is water-soluble.

"Zwitterionic polymer" means a polymer composed from zwitterionic monomers and, possibly, other non-ionic monomer(s). In zwitterionic polymers, all the polymer chains and segments within those chains are rigorously electrically neutral. Therefore, zwitterionic polymers represent a subset of amphoteric polymers, necessarily maintaining charge neutrality across all polymer chains and segments because both anionic charge and cationic charge are introduced within the same zwitterionic monomer. The zwitterionic polymer is water-soluble.

Preferred Embodiments

The membrane separation system of the present invention may comprise one or more types of membranes. The number of membranes and orientation of membranes (submerged/external) depends on various factors known to those of ordinary skill in the art, e.g. the composition of the process water.

In one embodiment, the membrane separation system has at least one membrane selected from the group consisting of: an ultrafiltration membrane; a microfiltration membrane; and a combination thereof.

In another embodiment, the additional membrane separation system has a membrane selected from the group consisting of: an ultafiltration membrane, a nanofiltration membrane; a reverse osmosis membrane; and a combination thereof. When an ultrafiltration membrane is used in said additional membrane system, membrane pore size is smaller than for the ultrafiltration membrane used in said membrane separation system.

In another embodiment, the membrane separation system is a submerged membrane system, an external membrane separation system, or a combination thereof.

In another embodiment, the additional membrane separation system is a submerged membrane system, external membrane separation system, or a combination thereof.

The membranes utilized may have various types of physical and chemical parameters.

With respect to physical parameters, in one embodiment, the ultrafiltration membrane has a pore size in the range of 0.003 to 0.1 µm.

In another embodiment, the microfiltration membrane has a pore size in the range of 0.1 to 10 µm.

In another embodiment, the membrane has a hollow fiber configuration with outside-in or inside-out filtration mode.

In another embodiment, the membrane has a flat sheet configuration.

In another embodiment, the membrane has a tubular configuration.

In another embodiment, the membrane has a multi-bore structure.

In another embodiment, the membrane has a capillary configuration.

In another embodiment, the membrane has spiral wound configuration.

With respect to chemical parameters, in one embodiment, the membrane is polymeric.

In another embodiment, the membrane is inorganic. In yet another embodiment, the membrane is stainless steel.

There are other physical and chemical membrane parameters that may be implemented for the claimed invention, and would be apparent to one of ordinary skill in the art without undue experimentation.

The pond water, prior to passing through a membrane separation system, is treated with an effective amount of one or more water-soluble cationic polymers, amphoteric polymers, zwitterionic polymers, or combination thereof. These water soluble polymers are referred to as MPEs.

In one embodiment, the amphoteric polymers are selected from the group consisting of at least one of the following: dimethylaminoethyl acrylate methyl chloride quaternary salt (DMAEA.MCQ)/acrylic acid copolymer, diallyldimethylammonium chloride/acrylic acid copolymer, dimethylaminoethyl acrylate methyl chloride salt/N,N-dimethyl-N-methacrylamidopropyl-N-(3-sulfopropyl)-ammonium betaine copolymer, acrylic acid/N,N-dimethyl-N-methacrylamidopropyl-N-(3-sulfopropyl)-ammonium betaine copolymer and DMAEA.MCQ/Acrylic acid/N,N-dimethyl-N-methacrylamidopropyl-N-(3-sulfopropyl)-ammonium betaine terpolymer.

In another embodiment, the effective amount of amphoteric polymers is from about 1 ppm to about 500 ppm of active solids.

In another embodiment, the amphoteric polymers have a weight average molecular weight of about 5,000 to about 2,000,000 daltons.

In another embodiment, the amphoteric polymers have a cationic charge equivalent to an anionic charge equivalent ratio of about 4.0:6.0 to about 9.8:0.2.

In another embodiment, the cationic polymers are selected from the group consisting of at least one of the following: polydiallyldimethylammonium chloride; polyethyleneimine; polyepiamine; polyepiamine crosslinked with ammonia or ethylenediamine; condensation polymer of ethylenedichloride and ammonia; condensation polymer of triethanolamine and tall oil fatty acid; poly(dimethylaminoethylmethacrylate sulfuric acid salt); and poly(dimethylaminoethylacrylate methyl chloride quaternary salt).

In another embodiment, the cationic polymers are copolymers of acrylamide (AcAm) and one or more cationic monomers selected from the group consisting of: diallyldimethylammonium chloride, dimethylaminoethylacrylate methyl chloride quaternary salt, dimethylaminoethylmethacrylate methyl chloride quaternary salt and dimethylaminoethylacrylate benzyl chloride quaternary salt.

In another embodiment, the effective amount of cationic polymers is from about 0.05 ppm to about 400 ppm active solids.

In another embodiment, the cationic polymers have a cationic charge of at least about 5 mole percent.

In another embodiment, the cationic polymers have a cationic charge of 100 mole percent.

In another embodiment, the cationic polymers have a weight average molecular weight of about 100,000 to about 10,000,000 daltons.

In another embodiment, the zwitterionic polymers are composed of about 1 to about 99 mole percent of N,N-dimethyl-N-methacrylamidopropyl-N-(3-sulfopropyl)-ammonium betaine and about 99 to about 1 mole percent of one or more nonionic monomers.

In another embodiment, the effective amount of zwitterionic polymers is from about 1 ppm to about 500 ppm active solids.

In another embodiment, as shown in FIG. 1, utilized process water is sent to a tailings settling pond. Water from the tailings settling pond is treated with MPE chemistry and pumped into a membrane separation system that either has a UF or MF membrane. One or more MPEs may be added in-line before the membrane system (external or submerged) or directly in the membrane tank when submerged membrane systems are utilized. The water is transferred/pumped from the pond via various techniques that would be apparent to one of ordinary skill in the art. The permeate flows back for use in a process or is further purified through an additional membrane separation system, which contains a NF or RO membrane. Permeate from the additional membrane separation system is sent back for use in the process. The concentrate from either membrane separation system is either disposed of, dewatered, or a combination thereof. In the case of dewatering, the liquid is sent back to the pond or reused in a process with or without further treatment.

Water from a tailings settling pond has high levels of hydrocarbons.

In one embodiment, the pond water contains TS from about 10 to 10,000 ppm; TSS from about 2 to about 1000 ppm; oil and grease from about 1 to about 100 ppm; TOC from about 1 to about 100 ppm; pH from about 7 to about 9; turbidity from about 2 to about 500 NTU; and color from about 5 to about 100 Pt—Co units.

The following examples are not meant to be limiting.

EXAMPLES

For the below mentioned experiments, PRODUCT A contains DMAEA.MCQ/AcAm copolymer with 50 mole % cationic charge. PRODUCT A is available from Nalco Company, Naperville, Ill.

A. Flux Enhancement Experiments

1. Protocol:

Pond water used for the following experiments was obtained from a Canadian oil sands processing facility. The pond water had the following characteristics: TS:360 ppm; TSS:49 ppm; oil and grease:27 ppm; TOC: 53 ppm; pH:8.8; conductivity:3.1 mS/cm; turbidity:78 NTU; and color:55 Pt—Co units.

The pond water was added to a tank with an overhead mixer and was treated with 3 ppm or 8 ppm of PRODUCT A (determined based on jar tests). The mixture was mixed with an overhead mixer and was operated for one minute at high speed followed by one minute at slow speed. The treated water was then placed in a membrane tank in which a flat plate microfiltration (MF) membrane, purchased from Yuasa, Japan, was submerged. Critical and sustainable fluxes through the membrane were measured with control (untreated) and treated pond water.

Critical flux is the flux above which, the membrane gets fouled severely and the trans-membrane pressure (TMP) rises dramatically. Therefore, determination of critical flux is important. Critical flux determination gives an idea for sustainable flux, which is a flux at which membranes can be operated for longer duration before requiring cleaning. Based on several studies known to those of ordinary skill in the art, sustainable flux is usually 60-70% of critical flux. Sustainable flux determines the plant capital cost (amount of membrane area, associated accessories and land) and operating cost (cleaning, labor, etc).

To obtain the critical flux, first the lowest flux of 30 LMH (liters per square meter per hour) was applied and the trans-membrane pressure (TMP) was monitored for 15 minutes. After 15 minutes, the next higher flux was applied and again TMP was measured. This procedure was continued until TMP of 2.5-3 psi was reached. For the particular MF membrane tested, the manufacturer catalog recommended about 3 psi to be the limit after which membrane has to be cleaned.

Based on critical flux obtained with control, a flux of 53 LMH was applied and TMP was measured over several hours to determine the sustainability of this flux. With treatment, the same flux was applied to compare the TMP increase rate with time.

2. Results a. Critical Flux

FIG. 2 shows critical flux data of pond water through the membrane at the following data points: control (No PRODUCT A); 3 ppm of PRODUCT A; and 8 ppm of PRODUCT A. It is apparent from FIG. 2 that the critical flux in the control was about 75-80 LMH, whereas with PRODUCT A treated pond water, critical flux was not distinctly detected. The absolute TMP and rate of TMP increase at any flux was lowest with 8 ppm PRODUCT A treated pond water.

b. Sustainable Flux

FIG. 3 shows the sustainability of 53 LMH flux with control and 8 ppm PRODUCT A treated pond water. It is clearly seen that within 3 hrs, the TMP in control increased to about 0.8 psi, whereas with treatment, the TMP increased to only 0.5 psi, even after 24 hrs of filtration. In fact, with the treated water having a flux of 72 LMH, the rate of TMP increase was still very low and TMP reached only 0.7 psi with 8 hrs of filtration.

Thus it is clear that sustainable flux can be increased from about 30 LMH (data not shown) with the control to about 60-72 LMH with 8 ppm PRODUCT A treatment, a more than 100% enhancement in flux.

c. Water Quality

Table 1 shows improvement in water quality after microfiltration of control and treated pond water. The turbidity was consistently <0.2 NTU with both control and treated pond water. The color removal was also higher after 8 ppm PRODUCT A treatment than in control.

TABLE 1

| | Water Quality | | | |
|---|---|---|---|---|
| | Turbidity (NTU) | | Color (Pt—Co Units) | |
| Treatment | Feed | MF Permeate | Feed | MF Permeate |
| Control | 32.8 | 0.1-0.2 | 43 | 38 |
| 3 ppm PRODUCT A | 27.4 | 0.1-0.2 | 45 | 38 |
| 8 ppm PRODUCT A | 4.47 | 0.1-0.2 | 65 | 33 |

The claimed invention is:

1. A method of purifying oil sand process water, comprising:
   (a) sending utilized process water from a bitumen extraction process to a tailings setting pond;
   (b) treating water from the tailings settling pond with an effective amount of one or more water-soluble cationic polymers, amphoteric polymers, zwitterionic polymers, or a combination thereof, wherein the tailings settling pond water contains total suspended solids (TSS) from about 2 to about 1,000 ppm prior to said treatment;
   (c) passing the treated water through a membrane separation system at a sustainable flux, wherein the sustainable flux is 60-70% of a critical flux determined for the water from the tailings settling pond treated with one or more of said polymers;
   (d) optionally, passing the permeate from step (c) through an additional membrane filtration system that is a submerged membrane system, an external membrane separation system, or a combination thereof; and
   (e) sending the permeate back for use in a bitumen extraction process;
   wherein said effective amount of cationic polymers is from about 0.05 ppm to about 400 ppm active solids;
   wherein said effective amount of amphoteric polymers is from about 1 ppm to about 500 ppm of active solids;
   wherein the effective amount of zwitterionic polymers is from about 1 ppm to about 500 ppm active solids;
   wherein the critical flux is determined for the water from the tailings settling pond treated with one or more of said polymers by monitoring trans-membrane pressure for 15 minutes at a first lowest flux of 30 liters per square meter per hour (LMH), and then after 15 minutes monitoring trans-membrane pressure at a next higher flux, continuing the procedure of increasing flux and measuring trans-membrane pressure until a trans-membrane pressure of 2.5-3 pounds per square inch is reached.

2. The method of claim 1, wherein said membrane separation system has at least one membrane selected from the group consisting of: an ultrafiltration membrane; a microfiltration membrane; and a combination thereof.

3. The method of claim 1, wherein said additional membrane separation system has at least one membrane selected from the group consisting of: an ultrafiltration membrane having a pore size smaller than for a different ultrafiltration membrane used in said membrane separation system; a nanofiltration membrane; a reverse osmosis membrane; and a combination thereof.

4. The method of claim 1, wherein the membrane separation system is a submerged membrane system, an external membrane separation system, or a combination thereof.

5. The method of claim 1, wherein the amphoteric polymers are selected from the group consisting of at least one of the following: dimethylaminoethyl acrylate methyl chloride quaternary salt/acrylic acid copolymer, diallyldimethylammonium chloride/acrylic acid copolymer, dimethylaminoethyl acrylate methyl chloride salt/N,N-dimethyl-N-methacrylamidopropyl-N-(3-sulfopropyl)-ammonium betaine copolymer, acrylic acid/N,N-dimethyl-N-methacrylamidopropyl-N-(3-sulfopropyl)-ammonium betaine copolymer and DMAEA.MCQ/Acrylic acid/N,N-dimethyl-N-methacrylamidopropyl-N-(3-sulfopropyl)-ammonium betaine terpolymer.

6. The method of claim 1, wherein the amphoteric polymers have a weight average molecular weight of about 5,000 to about 2,000,000 daltons.

7. The method of claim 1, wherein the amphoteric polymers have a cationic charge equivalent to an anionic charge equivalent ratio of about 4.0:6.0 to about 9.8:0.2.

8. The method of claim 1, wherein the cationic polymers are selected from the group consisting of at least one of the following: polydiallyldimethylammonium chloride; polyethyleneimine; polyepiamine; polyepiamine crosslinked with ammonia or ethylenediamine; condensation polymer of ethylenedichloride and ammonia; condensation polymer of triethanolamine and tall oil fatty acid; poly (dimethylaminoethylmethacrylate sulfuric acid salt); and poly (dimethylaminoethylacrylate methyl chloride quaternary salt).

9. The method of claim 1, wherein the cationic polymers are copolymers of acrylamide and one or more cationic monomers selected from the group consisting of: diallyldimethylammonium chloride, dimethylaminoethylacrylate methyl chloride quaternary salt, dimethylaminoethylmethacrylate methyl chloride quaternary salt and dimethylaminoethylacrylate benzyl chloride quaternary salt.

10. The method of claim 1, wherein the cationic polymers have a cationic charge of at least about 5 mole percent.

11. The method of claim 1, wherein the cationic polymers have a cationic charge of 100 mole percent.

12. The method of claim 1, wherein the cationic polymers have a weight average molecular weight of about 100,000 to about 10,000,000 daltons.

13. The method of claim 1, wherein the zwitterionic polymers are composed of about 1 to about 99 mole percent of N,N-dimethyl-N-methacrylamidopropyl-N-(3-sulfopropyl)-ammonium betaine and about 99 to about 1 mole percent of one or more nonionic monomers.

14. The method of claim 1, wherein the tailings settling pond water contains TS from about 10 to 10,000 ppm; oil and grease from about 1 to about 100 ppm; TOC from about 1 to about 100 ppm; pH from about 7 to about 9; turbidity from about 2 to about 500 NTU; and color from about 5 to about 100 Pt-Co units.

15. The method of claim 1, wherein the method provides a more than 100% enhancement in sustainable flux over sustainable flux of the process water before treatment with said polymers.

16. The method of claim 1, wherein the method reduces turbidity and color of the treated water.

* * * * *